Jan. 29, 1957   J. POWELL   2,779,511
SEED PLANTING MACHINE
Filed Jan. 21, 1955
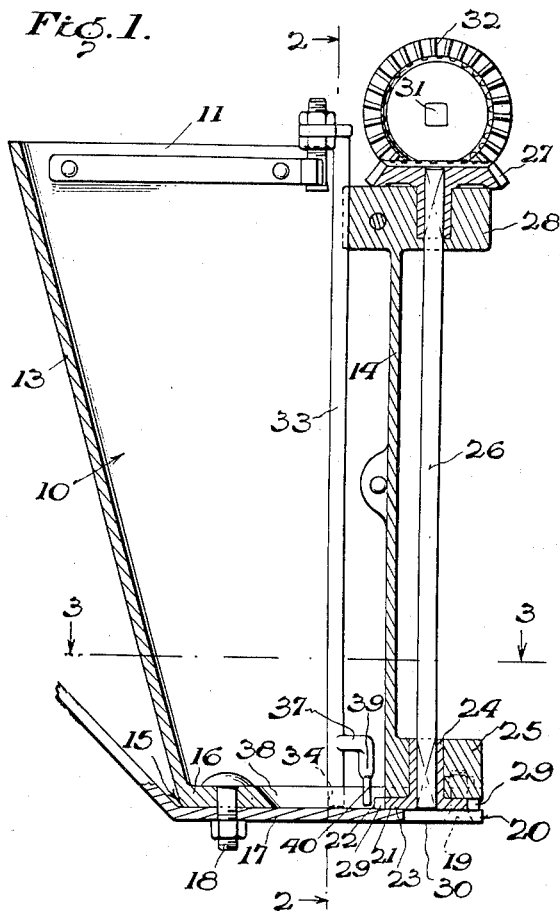
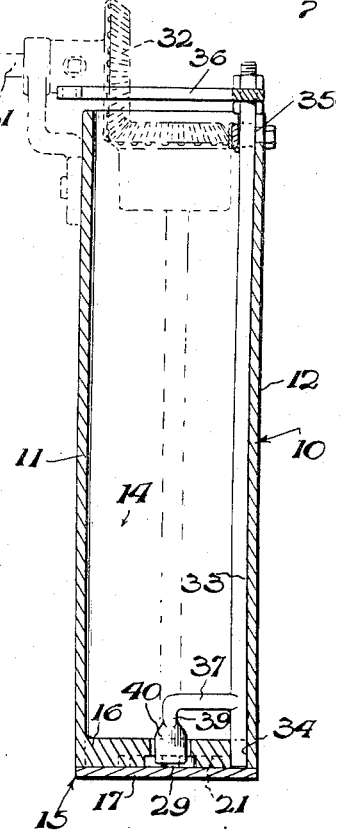
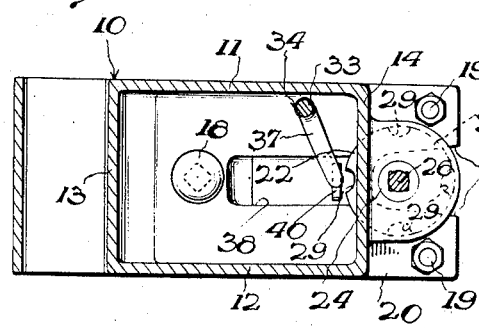
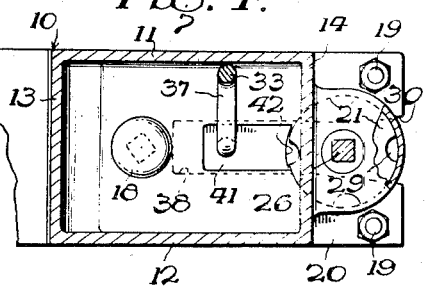
INVENTOR
John Powell.
BY
ATTORNEY

United States Patent Office 2,779,511
Patented Jan. 29, 1957

2,779,511

SEED PLANTING MACHINE

John Powell, Kokomo, Ind.

Application January 21, 1955, Serial No. 483,224

5 Claims. (Cl. 222—216)

This invention relates to seed planting machines and is more particularly concerned with machines specially designed for planting light weight seeds, such as tomato seeds.

In my prior Patents Nos. 2,532,191 and 2,532,192, both granted on November 28, 1950, I have described seed planting machines of the type referred to above comprising a rotatable seed disc containing marginal pockets for metering the seeds from a seed hopper and means for agitating the seeds in the hopper above the metering disc. As a result of this arrangement, seeds fall into the pockets of the metering disc by gravity. I have found that such an arrangement, while generally satisfactory, does not always give uniform results under various conditions of operation.

Accordingly, the general object of this invention is the provision of an improvement over the devices as shown in my said prior patents for giving uniform results.

A specific object of the invention is the provision of an improvement in a seed planting machine of the type mentioned which does not depend upon gravity for filling the pockets of the metering disc with seeds from the hopper.

A further object of the invention is the provision of a positive feed mechanism for the metering disc pockets.

Other objects and advantages of the invention will be apparent from the following description considered together with the accompanying drawing.

In the drawing:

Fig. 1 is a vertical longitudinal section through a seed hopper and its related seed delivery means constructed in accordance with this invention.

Fig. 2 is a sectional view along the line 2—2 of Fig. 1.

Fig. 3 is a plan sectional view along the line 3—3 of Fig. 1.

Fig. 4 is a view similar to Fig. 3 showing a modified and preferred form of the invention.

Referring with more particularity to the drawing in which like numerals designate like parts, the embodiment illustrated comprises a seed hopper 10 as an integral part of a seed planting machine as shown in my said prior patents.

The hopper 10 has side walls 11 and 12, end walls 13 and 14, and a bottom wall 15. The bottom wall comprises an upper portion 16 and a lower portion 17 secured together by bolts 18 and 19 or, alternatively, by rivets, welding, or any other suitable means.

The lower portion 17 of the bottom wall includes a projection endwise beyond the end wall 14 to form an exterior shelf 20.

A horizontal metering disc 21 is disposed on the shelf 20 with a portion 22 thereof extending through an outlet slot 23 in the end wall 14. The disc 21 has an upwardly projecting hub 24 which is rotatably mounted in a bearing formed in a boss 25 extending outwardly from the wall 14 as an integral part thereof and overlying the disc 21. The hub 24 is fixed to the bottom end of a vertical shaft 26 for rotation therewith. The upper end of the shaft 26 is fixed to a bevel gear 27 which is journaled in a boss 28 of the wall 14, substantially as shown.

The disc 21 is provided with one or more marginal pockets 29, similar to those in the patents referred to above which are filled with seeds on the interior of the hopper and from which the seeds are discharged on the exterior of the hopper when the pocket is in a position over an opening 30 of the extension shelf 20.

Power for rotating the disc 21 is transmitted from a power shaft 31, through bevel gear 32 meshing with the bevel gear 27.

To insure positive feeding of seeds to the pockets 29, there is disposed within the hopper 10 a vertical shaft 33 having its lower end rotatably mounted in an aperture 34 of the upper portion 16 of the bottom wall and resting upon the lower portion 17 of said wall. The upper end of the shaft 33 is rotatably mounted in a bearing 35 and it extends upwardly beyond the bearing to receive an arm 36.

A short distance above the bottom wall of the hopper, an arm 37 extends from the shaft 33 toward the middle of the bottom wall above a trough in the bottom wall formed by cutting out a slot 38 in the upper portion 16 extending from the wall 14 toward the opposite wall 13, substantially as shown. The outer end of the arm 37 is bent downwardly to form a leg 39 extending into the trough opposite the rim of the disc 21. By oscillating the arm 36, the leg 39 moves to and from the disc 21.

Oscillations of the arm 36 may be effected manually or mechanically synchronized with the rotation of the shaft 26 toward the disc each time an empty pocket enters or moves through the hopper, thereby providing a positive displacement of seed in the hopper toward the pocket and insuring a complete filling of each pocket before it leaves the hopper to be discharged above the opening 30. The leg 39 is preferably flattened to provide a flat surface 40 facing the disc 21 as this insures an efficient operation.

In the embodiment illustrated in Fig. 4 the flat surface 40 is eliminated and instead there is provided a member 41 in the slot 38 which is approximately as wide as, but substantially shorter than the slot and is pivotally engaged with the leg 39. The end 42 of the member 41 nearer the metering disc is provided with a concave curvature to match the convex curvature of the disc. By these means a better operation is obtained due to the rectilinear motion of the member 41 and the fact that it can for this reason be made wider than the flat surface 40.

I claim:

1. In a seed planting machine having a seed hopper, an outlet at the bottom of the hopper, a metering disc in said outlet, said metering disc having pockets at the periphery thereof, a movable member in said hopper radially disposed relative to the disc adjacent the periphery thereof, and means for oscillating said member within the hopper to and from the said disc.

2. In a seed planting machine as defined by claim 1 in which the oscillation means comprises a shaft rotatably mounted in the hopper, said member being eccentrically secured to said shaft, and an arm connected to the top of the shaft for rotating the shaft alternately in opposite directions.

3. In a seed planting machine as defined by claim 1 in which the hopper has a bottom wall, and the said bottom wall is provided with a trough adjacent the disc for the member to move in.

4. In a seed planting machine having a seed hopper, an outlet at the bottom of the hopper, a metering disc in said outlet, said metering disc having pockets at the periphery thereof, a member radially adjacent the periphery of the disc on the interior of the hopper, said member having a trough portion contiguous and coplanar with the periphery of said disc, a seed pusher disposed in said trough, and means for oscillating said pusher in the trough to and from the said disc.

5. In a seed planting machine having a seed hopper, an outlet at the bottom of the hopper, a metering disc in said outlet, said metering disc having pockets at the periphery thereof, a member radially adjacent the periphery of the disc on the interior of the hopper having a trough portion contiguous and coplanar with the periphery of said disc, a seed pusher slidably disposed in said trough for movement therein to and from said disc, and means for so moving said seed pusher, said means including a vertical rocker shaft, a horizontal arm extending from said shaft, the outer end of said arm being pivotally connected to said pusher.

References Cited in the file of this patent
UNITED STATES PATENTS

| | | |
|---|---|---|
| 2,366,379 | Bemis | Jan. 2, 1945 |
| 2,532,191 | Powell | Nov. 28, 1950 |
| 2,532,192 | Powell | Nov. 28, 1950 |